Patented Sept. 7, 1943

2,328,748

UNITED STATES PATENT OFFICE 2,328,748

COPOLYMER OF VINYL CHLORIDE, VINYL ACETATE, AND VINYLIDENE CHLORIDE

Winfield Scott, Akron, and Raymond B. Seymour, Dayton, Ohio, assignors to Wingfoot Corporation, Wilmington, Del., a corporation of Delaware No Drawing. Application May 20, 1942, Serial No. 443,764

2 Claims. (Cl. 260—86)

This invention relates to copolymers of vinyl chloride, vinylidene chloride and vinyl acetate, in which vinyl chloride is present in predominate amounts. Such intramolecular mixed polymers possess good heat stability and show certain advantages in solubility, as for example in ethylene dichloride, over vinyl chloride-vinylidene chloride copolymers in the absence of vinyl acetate.

The amount of vinyl acetate employed in the monomer mixture is relatively small so that the amount of the vinyl acetate groups in the copolymer varies between 4 and 15% of the total weight. The vinylidene chloride may comprise anywhere from 4 to 40 parts by weight of the copolymer, while the vinyl chloride is used in the range of from 40 to 90 parts. Relative proportions of vinyl chloride to vinylidene chloride are from 85 to 90 parts of the former to 15 to 10 parts of the latter, although other ratios of these may be used.

These copolymers may be made either as emulsion polymers, in solution in an organic medium in which the copolymers are insoluble or in mass polymerizations. However the polymerization is carried out, the resultant products form tough, elastic plastics when processed with such well known plasticizers as tritolyl phosphate, dibutyl sebacate, dioctyl phthalate and the like. The amount of plasticizer employed will vary, depending upon the properties desired in the resultant product, and is usually employed in proportions from 10 to 200 parts to 100 parts of the copolymer.

The following examples illustrate the practice of the invention.

*Example 1.*—A polymerization in emulsion was carried out as follows where the components are indicated as parts by weight:

| | |
|---|---:|
| Water | 60 |
| Carbon tetrachloride | 1.6 |
| Sodium lauryl sulfate | 1.5 |
| Disodium phosphate | .72 |
| Citric acid | .11 |
| Sodium perborate | .40 |
| Vinyl chloride | 41.85 |
| Vinylidene chloride | 4.65 |
| Vinyl acetate | 3.50 |

This charge was subjected to polymerizing conditions at 37° for a period of 66 hours, at which time the emulsion had set to a semisolid. It was added to an excess of water and dispersed, then precipitated by the addition of an electrolyte such as potassium chloride. After filtering and washing free from extraneous material the copolymer was obtained as a white powder in a 94% yield. This material is soluble in ethylene dichloride.

*Example 2.*—The vinyl chloride and vinylidene chloride are here in the ratio of 90 to 10 and the combined vinyl chloride and vinylidene chloride are in the ratio of 90 to 10 to the vinyl acetate. Amounts used are shown in the table.

| | Parts |
|---|---:|
| 3% sodium lauryl sulfate solution | 15 |
| McIlvane buffer pH 7 | 15 |
| Sodium perborate | 0.12 |
| Vinyl chloride | 20.25 |
| Vinylidene chloride | 2.25 |
| Vinyl acetate | 2.50 |

Polymerization was carried out with agitation at 37° C. A yield of 86% of copolymer was obtained after 146 hours. The copolymer, a fine, white powder, is adaptable on plasticizing to form either rigid or rubber-like articles with stability toward heat and light.

Example 3 illustrates a copolymer in which the vinyl acetate is employed in an amount greater than the vinylidene chloride used. The polymerizing aids were the same as those used in Example 2, the proportion of monomers being vinyl chloride 78%, vinylidene chloride 9%, and vinyl acetate 13%. Polymerization was carried out at 35° for a period of six days. After coagulating the copolymer from the latex by the addition of alcohol, the product was obtained as a white powder.

Copolymers of vinyl chloride, vinylidene chloride and vinyl acetate have been prepared as mass polymers and in solution in a partial or non-solvent. Satisfactory polymers have been obtained by each of these methods, each possessing the same or equivalent properties. In the mass polymerization, benzoyl peroxide was used as a catalyst. The reaction may be carried out by the aid of ultra violet light although this is not necessary.

What we claim is:

1. A copolymer of vinyl chloride, vinylidene chloride and vinyl acetate, the vinyl acetate groups in the copolymer being present in an amount equal to 4 to 15% of the weight of the copolymer and the vinyl chloride groups and vinylidene chloride groups being present in the ratio of 85 to 90 of the former to 15 to 10 of the latter.

2. A copolymer consisting of 4 to 15% by weight of vinyl acetate groups, 4 to 40% by weight of vinylidene chloride groups and 40 to 90% by weight of vinyl chloride groups.

WINFIELD SCOTT.
RAYMOND B. SEYMOUR.